INVENTOR
F. T. ANDREWS, JR.
BY [signature]
ATTORNEY

Dec. 12, 1961 F. T. ANDREWS, JR 3,013,252

MAGNETIC CORE SHIFT REGISTER CIRCUITS

Filed May 29, 1956 4 Sheets-Sheet 2

INVENTOR
F. T. ANDREWS, JR.
BY James W. Falk
ATTORNEY

INVENTOR
F. T. ANDREWS, JR.
BY [signature]
ATTORNEY

INVENTOR
F. T. ANDREWS, JR.
BY
[signature]
ATTORNEY 3,013,252
MAGNETIC CORE SHIFT REGISTER CIRCUITS Frederick T. Andrews, Jr., Berkeley Heights, N.J., assignor to Bell Telephone Laboratories, Incorporated, New York, N.Y., a corporation of New York Filed May 29, 1956, Ser. No. 588,011
5 Claims. (Cl. 340—174)

Figures 1, 2:
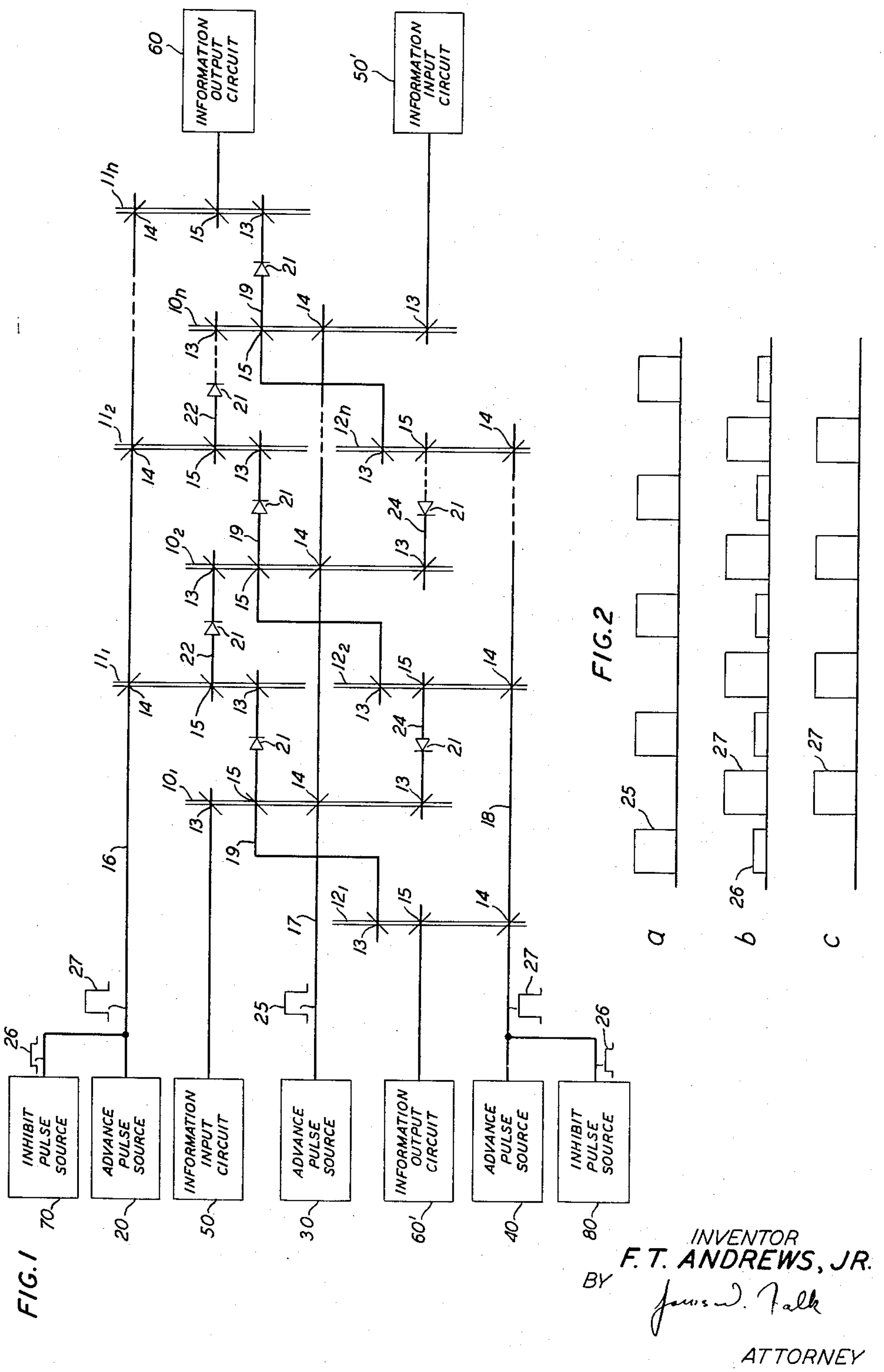

This invention relates to magnetic core circuits and more particularly to magnetic core shift register circuits in which information stored therein may be serially shifted out of the register or parallelly shifted out and returned to the original address as desired.

Magnetic cores displaying substantially rectangular hysteresis characteristics have found wide application in many electrical circuits as a substitute for more expensive and less reliable electronic elements. The ability of a magnetic core to remain in a particular state of magnetic saturation to which driven by an applied magnetomotive force makes such a core particularly suited for use in any circuit in which a storage or delay of information is desired. Thus, in a binary number system a magnetic state of one polarity may be assigned to represent the binary value "1" and the magnetic state of the opposite polarity is then assigned to represent the binary value "0."

One circuit in which magnetic cores are advantageously employed to store binary information in the manner referred to is a well-known magnetic core delay line or shift register. In such a shift register a plurality of magnetic cores are serially coupled together with alternating cores being additionally connected by circuit means including advance windings on each of the alternating cores. When the first core is set, that is, when the core is in a saturated magnetic state of a polarity representing the binary information value "1," a first phase advance pulse is applied to the alternating cores including the set core of the plurality of cores and this core containing the binary "1" is reset, that is, the core is switched to the opposite saturated magnetic state representing the binary information value "0." The resetting of the first core operates, by means of a coupling loop, to switch the magnetic state of the second core to a set condition, that is, to a magnetic state of a polarity representing the binary information value "1." The "1" originally in the first core has thus been shifted to the second core.

A second phase advance pulse is now applied to the alternating cores including the second of the plurality of cores and the second core is thereby reset. The "1" contained in the second core is, in the manner described above, shifted to the third core, leaving both the first and the second core in a magnetic state of a polarity representing the binary value "0." The alternate application of advance pulses may be continued until the information value has been shifted to the last core of the plurality of cores and, thereafter, out of the shift register into external information utilizing circuits. Information introduced in the register is thus shifted along the register by storing each bit momentarily in a particular core and then shifting it to the next core until the information bit finally is shifed out of the last core, whereupon the information is lost as to the register unless stored in external circuits and returned to the shift register by external means.

The basic storage unit of a simple magnetic core shift register as described is comprised of two storage cores, the information being shifted out of the unit only after the application of a first and a second phase advance pulse. Two cores necessarily make up a minimal storage unit for the reason that the information stored in the first core must be shifted to the second core of the unit in order to make place in the first core for information to be newly introduced in the register or shifted from a preceding storage unit. In a shift register of this character the information can be shifted by means of the alternate phase advance pulses in one direction only, that is, an information bit stored in a particular core can be shifted only to the next succeding core and from that core to its next succeeding core. This unidirectional limitation restricts the use of such a magnetic core shift register in some information processing application. It is often desirable in such applications to have available a magnetic core information storage register in which the information stored therein can be shifted out serially in either direction. Further, whenever it becomes necessary to determine specifically the character of the information stored in the conventional shift register or in any particular address within the register, it is necessary to shift the information completely out of the register or at least as far as is necessary to make the desired determination. One answer to the latter problem of sampling the stored information while at the same time retaining it within the register is to connect the output of the last core to the input of the first core of the register and circulating the information in the register upon the alternate application of advance pulses. In this case, too, however, information stored in the register is continually changing its address without the information bits necessarily returning to the particular cores in which originally stored.

The problem presented by the latter limitation of the conventional magnetic core shift register has been answered in one specific register circuit arrangement which is described in the copending application of J. H. McGuigan, Serial No. 588,012, filed May 29, 1956, now U.S. Patent No. 2,942,241. In that arrangement transfer cores are associated with each storage core in a manner such that an information bit stored in a particular core may be transferred to one of the transfer cores, from which transfer core the information may then, upon the suitable application of a second phase advance pulse, be subsequently retransferred back to the particular core in which originally stored. The first phase advance pulse initially transferring the information from the storage core to the selected transfer core also operates as an inhibiting pulse for the other or non-selected transfer cores. Information stored in a particular storage core can thus, at the time at which shifted to the transfer core, be sampled and subsequently returned to the storage core in which originally stored.

An information bit may in this arrangement also be transferred to another transfer core and upon the application of the second phase advance pulse subsequently transferred to a next succeeding storage core to effect a forward shift of the information bit. It should be noted that in the arrangement of McGuigan the transfer cores associated with each storage core take the place of the second core of the basic two-core storage unit of the simplest form of conventional magnetic core shift register.

In view of the limitations encountered in known magnetic core shift register arrangements as outlined hereinbefore, it is an object of the present invention to provide an improved magnetic core shift register having a greater versatility over known magnetic core register arrangements.

It is another object of this invention to accomplish the serial shifting of information stored in a magnetic core shift register in either a forward or a reverse direction as may be desired.

Another object of this invention is to provide an improved magnetic core shift register in which the character of the information stored therein may be determined without at the same time permanently shifting the information out of the magnetic cores in which originally stored.

A further object of this invention is to provide an improved magnetic core shift register in which information stored therein may be shuttled between pairs of cores of the register.

Yet another object of this invention is to realize a magnetic core shift register in which information stored therein may be serially shifted in either direction by the substitution of only a pair of transfer cores for the second core of the basic storage unit of a conventional magnetic core shift register.

A still further object of this invention is to realize a magnetic core shift register in which the character of the information stored therein may be determined without permanently shifting the information out of the register by the substitution of only a pair of transfer cores for the second core of the basic storage unit of a conventional magnetic core shift register.

It is also an object of this invention to provide an improved magnetic core shift register in which information stored therein may be serially shifted in either of two directions or shuttled between pairs of cores in the register.

In an illustrative magnetic core shift register embodying the principles of the present invention, reversibility of information shift is accomplished by substituting for the second core of the basic storage unit of a conventional two-core-per-bit shift register a pair of transfer cores which may be designated a forward and a backward transfer core. Each storage unit will then comprise three magnetic cores. By means of suitable circuit means coupling the cores of each storage unit an information value may be shifted to either one of the transfer cores as a result of an advance pulse applied to the storage core. Information shift to the unselected transfer core is prevented by means of an inhibit pulse applied to that transfer core simultaneously with the application of the advance pulse to the storage core. Second advance pulses subsequently simultaneously applied to the transfer cores will shift the information value to either the next succeeding or next preceding storage cores by means of suitable circuit means coupling the cores of the next succeeding or next preceding storage units, depending upon which of the transfer cores received the information from the storage core. Obviously, the second advance pulses applied to the transfer cores not selected previously will have no effect with respect to the desired shift of information.

By suitably rearranging the coupling circuit means connecting a backward transfer core with its storage core, information shifted to the backward transfer core upon the application of an advance pulse to the storage core can readily be caused to return to the storage core in which initially stored by the application of second advance pulses applied to the transfer cores. Suitable output circuit means associated with each of the backward transfer cores then makes available for detection the character of the information shifted from the storage core at the time the backward transfer core containing the information bit is reset to return the information bit to the storage core. In this arrangement of an illustrative shift register according to the present invention, information stored therein is serially shiftable in one direction and also is parallelly available at the backward transfer cores with the added feature in the latter case that the information is returned to the same storage cores in which initially stored.

By the addition of one more transfer core to each storage unit of an illustrative embodiment of this invention, the versatility of the shift register may be readily extended to encompass both reversability of information shift and return of information to the original storage cores after parallel read-out. In this modification four cores make up a basic storage unit: a storage core and three transfer cores. By suitable inter-core and inter-unit coupling, and the application of suitable advance pulses, an information bit contained in a storage core can be selectively shifted to any one of the three transfer cores by inhibiting all of the transfer cores not selected. The information bit can then be further shifted to the next succeeding storage core, the next preceding storage core, or back to the initial storage core in which stored, depending upon the particular transfer core to which the information bit was previously shifted.

According to one feature of this invention, the advance windings of all of the transfer cores have applied thereon in addition to second phase advance pulses, and simultaneously with first phase advance pulses applied to the advance windings of the storage cores, the required inhibiting pulses to prevent the switching of the transfer cores to which applied. The inhibiting pulse is of a character and magnitude such as to counteract the effect of the simultaneously applied advance pulse, and may typically apply only approximately one-quarter the magnetizing force produced by the advance current pulses to counteract their switching effect.

According to another feature of this invention, the coupling loops connecting the output windings of the transfer cores and the input windings of the storage cores are combined. This expedient is possible since the groups of transfer cores are never switched simultaneously to transfer information contained therein into the storage cores, only one of the groups of transfer cores being selected in any one transfer operation. As a result of this combination of coupling loops an economy of circuit components is realized; for example, in a reversible shift register embodiment of the present invention only two diodes are necessary for each three-core-per-bit storage unit. In addition, each core of this basic storage unit will require only three windings: an advance winding, an input and an output winding.

Figure 3:
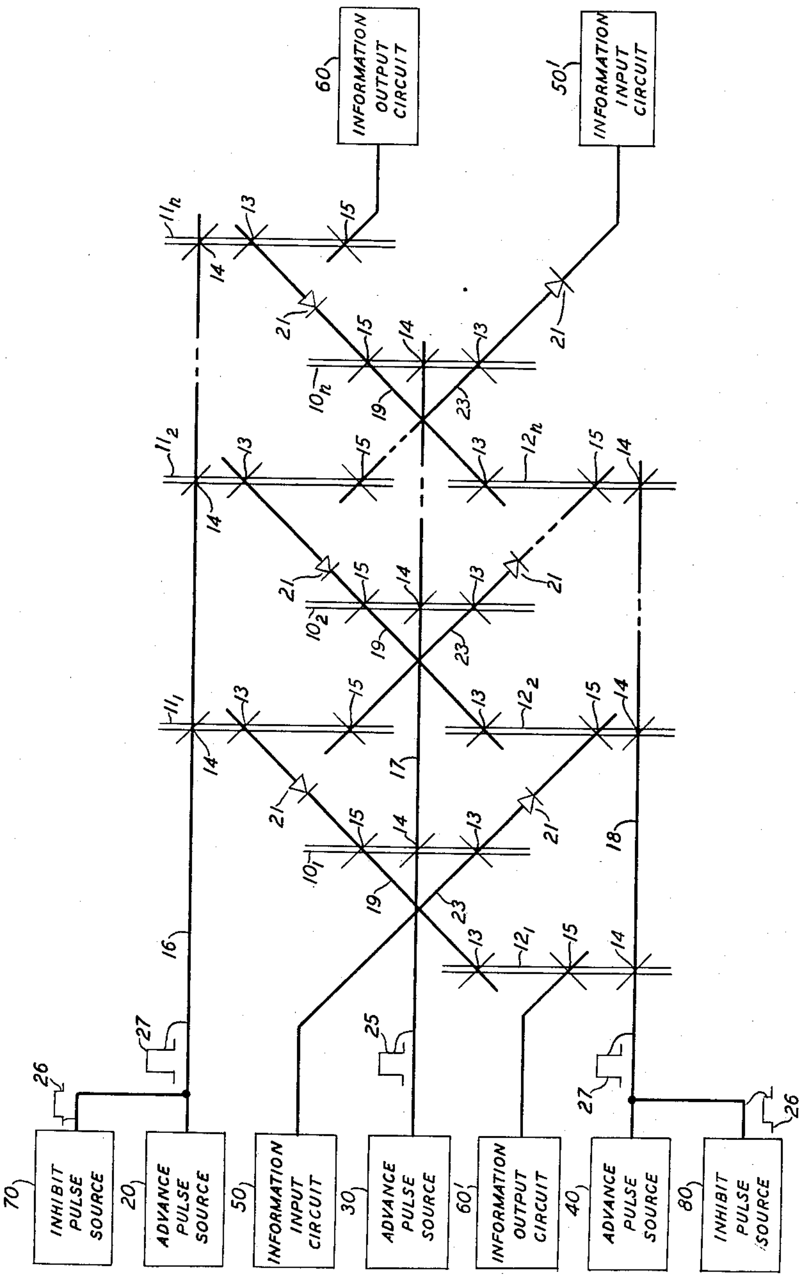
Figure 4:
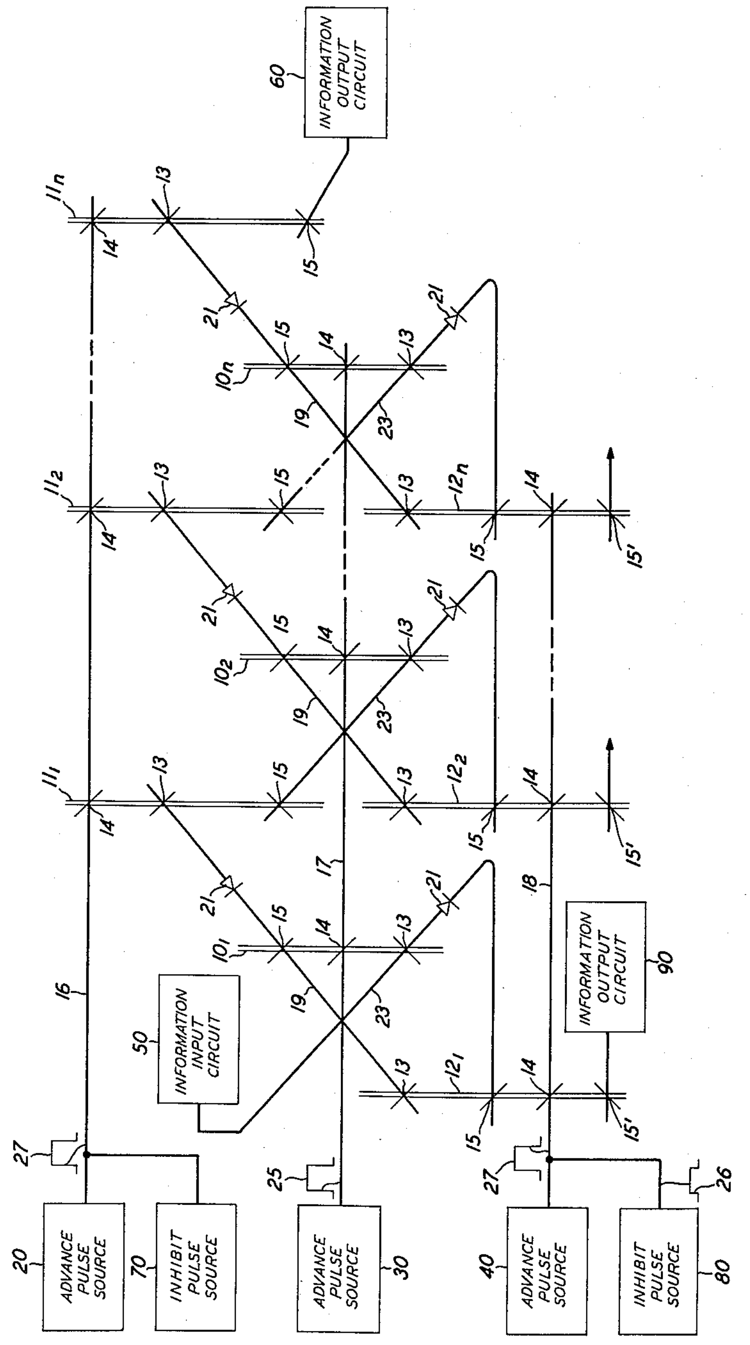
Figure 5:
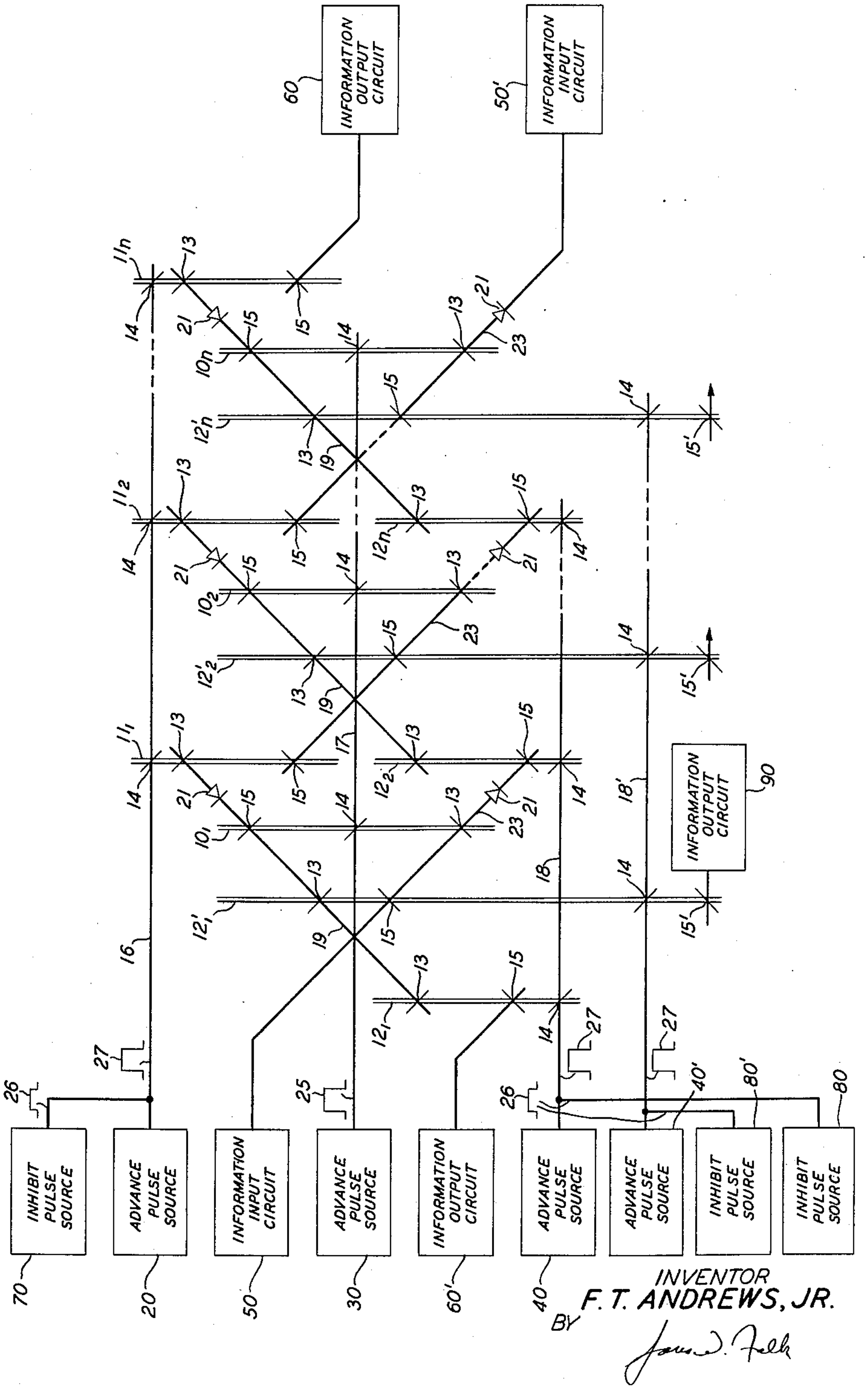

The above objects of the present invention, together with other objects and features thereof, will become apparent from a consideration of the detailed description of this invention which follows when taken in conjunction with the accompanying drawing, in which:

FIG. 1 is a schematic representation of an illustrative magnetic core shift register having a pair of transfer cores associated with each storage core to make possible the shift of information stored therein in either direction. Separate coupling loops provide the means whereby information is shifted from a preceding or succeeding transfer core to a storage core;

FIGS. 2(*a*), (*b*), and (*c*) show the time relationship and relative magnitudes of individual pulses of the various pulse trains applied to the storage and transfer cores of the shift registers according to the principles of this invention;

FIG. 3 is a schematic representation of an illustrative magnetic core shift register identical to the shift register shown in FIG. 1 with the exception that the coupling loops connecting a preceding and a succeeding transfer core to a storage core have been combined;

FIG. 4 is a schematic representation of another illustrative shift register embodying the principles of this invention in which one of the transfer cores associated with a storage core is coupled to the storage core in a manner such that information shifted thereto from the storage core can be reshifted back to the storage core to effect preservation of the information stored in the register during parallel read-out; and FIG. 5 is a schematic representation of still another shift register according to this invention in which three transfer cores are associated with a storage core thereby making possible the shift of information stored therein in either direction and, in addition, the shuttle of information between a storage and a transfer core to make the information parallelly available without shifting the information out of the register.

The schematic representation employed to most advantageously depict the embodiments of this invention is that of the mirror symbol notation also employed by M. Karnaugh in the Proceedings of the I.R.E. of May 1955, pages 570–583, and fully explained therein. The same reference characters are employed in the detailed description of this invention which follows to designate identical circuit elements wherever these elements are repeated in the various figures of the drawing.

A specific illustrative magnetic core shift register which is capable of shifting information stored therein in either direction and which is depicted in FIG. 1 of the drawing, is comprised of a series of storage cores $10_1$, $10_2$, and $10_n$, each of the storage cores having associated therewith a forward transfer core 11 and a backward transfer core 12. Input windings 13, advance windings 14, and output windings 15 are inductively coupled to each of the cores, with each of the storage cores 10 having two input windings 13 thereon. Conductors 16, 17, and 18 connect the advance windings 14 of the forward, storage, and backward transfer cores 11, 10, and 12 to suitable external advance pulse sources 20, 30, and 40, respectively. A suitable external information input circuit 50 is connected to the input winding 13 of the initial storage core $10_1$ of the shift register and an external information output circuit 60′ is connected to the output winding 15 of the last backward transfer core $12_1$ as viewed from the left-hand side of the figure. An external information input circuit 50′ is connected to one of the input windings 13 of the last storage core $10_n$ and an external information output circuit 60 is connected to the output winding 15 of the last forward transfer core $11_n$, when viewed from the right-hand side of the figure.

Connecting each of the forward and backward transfer cores 11 and 12 to the associated storage core 10 is a coupling loop 19 having included therein a unilateral current conducting element 21. The output winding 15 and the input winding 13 of each of the forward transfer and the storage cores, respectively, are connected by a coupling loop 22 also having included therein a unilateral current conducting element 21. Coupling loops 24 also having included therein unilateral conducting elements 21 connect the output windings 15 and the input windings 13 of the backward transfer cores 12 and the storage cores 10, respectively. Connected in parallel to the conductors 16 and 18 with the second phase advance pulse sources 20 and 40 are suitable external inhibit pulse sources 70 and 80, respectively.

Assuming now for purposes of description that a binary information value "1" is stored in each of the storage cores $10_1$, $10_2$, and $10_n$, when a first phase advance pulse originating in the pulse source 30 is applied via the conductor 17 to the advance windings 14 of the storage cores, the latter cores will be reset, that is, the cores will switch to the opposite polarity of remanent magnetic saturation thereby causing a current flow in the coupling loop 19. This current flow in the input windings 13 will be in a direction such as to switch the condition of the transfer cores 11 and 12, that is, from a condition of remanent saturation representing a binary value "0" to a condition representing a binary value "1." A pulse train representing advance pulses 25 supplied by the first phase advance pulse source 30 is shown in FIG. 2(*a*) of the drawing. Simultaneously with the application of an advance pulse 25 to the advance windings 14 of the storage cores 10, an inhibit pulse 26 is supplied to either of the conductors 16 or 18 from a selectively controllable inhibit pulse source 70 or 80. The inhibit pulse 26 thus applied will effectively prevent the current induced in the coupling loop 19 by the switching of the storage core 10 from setting an associated transfer core 11 or 12. The inhibit pulses 26 applied to either the conductor 16 or 18 are graphically represented in FIG. 2(*b*) of the drawing, and need produce only enough magnetizing force to counteract any switching input action that may occur and may advantageously be approximately one-quarter the magntizing force produced by the applied advance pulse 25.

Assuming that the information stored in the shift register is desired to be shifted in the forward, or right-hand direction when viewed in FIG. 1, an inhibit pulse 26 shown in FIG. 2(*b*) is applied to the conductor 18 simultaneously with an advance pulse 25 shown in FIG. 2(*a*) applied to the conductor 17. Due to the inhibiting effect of the pulse 26 no switching action will be caused in the backward transfer cores 12 as a result of the switching current in the coupling loops 19. However, each of the forward transfer cores 11 will be set as a result of the current flow in the coupling loops 19. As a result of a first phase advance pulse 25 applied to the advance winding 14 of the storage cores, the "1's" originally contained therein have now been shifted to the forward transfer cores 11. Second phase advance pulses 27 as shown in FIG. 2(*b*) and 2(*c*) are now simultaneously applied to the conductors 16 and 18 from second phase advance pulse sources 20 and 40, respectively, thereby causing any of the transfer cores previously set to be switched to a condition of remanent magnetization representing the binary value "0." This switching of the transfer cores 11 will induce a current in the coupling loops 22 through the output windings 15, which current will operate through the input winding 13 to set the succeeding storage cores 10. The "1's" transferred from the original storage cores 10 to the forward transfer cores 11 will in this manner have been shifted to the next succeeding storage cores.

It will be observed that the advance pulses 27 applied to the advance windings 14 of the backward transfer cores 12 simultaneously with the pulses 27 applied to the advance windings 14 of the forward transfer cores 11 will have no switching effect since the magnetic state of the former cores is already in a direction to which the advance pulses tend to drive them. As a result of the shifting operation the "1's" originally stored in the storage cores $10_1$ and $10_2$ will now have been shifted to the storage cores $10_2$ and $10_n$, respectively, and the "1" originally stored in the storage core $10_n$ and transferred by the first phase advance pulse to the forward transfer core $11_n$ will have been shifted out of the register to the external information output circuit 60. Simultaneously with the application of second phase advance pulses 27 to the conductors 16 and 18, new information in the form of binary digits to be stored may be introduced into the register from the information input circuit 50 to the first storage core $10_1$ by means of the input winding 13.

Should the shift of information in the register be desired in a reverse or left-hand direction as viewed in FIG. 1, and again assuming a binary information value "1" being stored in each of the storage cores 10, a first phase advance pulse 25 from the first phase advance pulse source 30 applied to the advance windings 14 of the storage cores 10 will again have the effect of shifting the "1's" stored in the storage cores 10 to the transfer cores 11 or 12 via the coupling loops 19. In this case, however, an inhibit pulse 26 will be applied to the advance conductor 16 from the inhibit pulse source 70 simultaneously with the application of an advance pulse 25 to the advance conductor 17. As a result, the forward transfer cores 11 will be prevented from shifting and the "1's" originally stored in the storage cores 10 will be shifted by means of the coupling loops 19 to the backward transfer cores $12_1$, $12_2$, and $12_n$. Subsequently, upon the application of the second phase advance pulses 27 applied simultaneously to the advance conductors 16 and 18, the information will be shifted to the left as viewed in FIG. 1 and the "1" originally stored in the storage cores $10_n$ and $10_2$ will be shifted to the storage cores $10_2$ and $10_1$, respectively, and the "1" originally stored in the storage core $10_1$ will be shifted out of the register via the output winding 15 of the backward transfer core $12_1$ to the external information output circuit 60′.

Upon the application of the second phase advance pulses 27 to the conductors 16 and 18, information in the form of binary digits to be newly introduced into the register from the right-hand side as viewed in FIG. 1 may be supplied by the external information input circuit 50'. The time relationship of the first phase advance pulses 25 and the second phase advance pulses 27 together with selectable superimposed inhibit pulses 26 are graphically shown in FIGS. 2(*a*), 2(*b*), and 2(*c*) of the drawing, FIG. 2(*b*) indicating the pulse train applied to the advance conductor 16 when the information shift is to be in a reverse direction and also representing the pulse train applied to the advance conductor 18 when information shift is to be in a forward direction. It is to be understood that, although the means for counteracting the switching effect of the current induced in the coupling loops 19 at the time of the application of the first phase advance pulses 25 on the unselected transfer cores is assumed for purposes of description to comprise simultaneously applied inhibit pulses 26 applied to the unselected transfer cores, a steady state biasing current could also readily have been applied to the unselected transfer cores. This biasing current would then counteract the switching effect of any applied switching current.

During the switching of either of the transfer cores 11 and 12 to transfer "1's" contained therein to succeeding or preceding storage cores 10, the direction of the current induced in the coupling loops 22 and 24, respectively, will be such as to tend to cause an undesired switching of preceding or succeeding storage cores 10. This effect is readily avoided by a suitable selection of turns ratios of the input and output windings 13 and 15 such that the voltage developed in the undesired direction is less than threshold voltage of the conducting elements 21.

A magnetic core shift register similar to that described in the foregoing and also embodying the principles of this invention is shown in FIG. 3 of the drawing. In this shift register the coupling loops 22 and 24 of the register of FIG. 1 have been combined with the result that a single loop 23 serves to connect a storage core 10 with both a forward transfer core 11 and a backward transfer core 12. This expedient is feasible because of the fact that transfer of information is not effected simultaneously from both of the transfer cores 11 and 12 to the storage cores 10 and as a result no undesired interaction is encountered. To accommodate the mirror symbol notation employed in the representation of the register of FIG. 3 the sense of the windings and the direction of the unilateral conducting elements 21 have been shown in reverse to that of the same elements of the register of FIG. 1. Similarly to make practicable the common loop 23 of the shift register of FIG. 3 the input windings 13 and the output windings 15 of the storage and backward transfer cores 10 and 12, respectively, are reversed as are the conducting elements 21. In neither case is the desired direction of information transfer affected. It will be noted that by the employment of the common coupling loop 23 each storage core 10 will require one less input winding 13 and, in addition, the function accomplished by two conducting elements 21 will be accomplished by a single such element. The operation of the shift register of FIG. 3 is identical to that described hereinbefore for the register shown in FIG. 1 with information in the form of binary digits being introducible into the register at either end as well as available at either end depending upon the direction of information shift.

The shift register depicted in FIG. 4 presents another embodiment of this invention in which, by slight modification of the register shown in FIG. 3, the shift of information from a particular storage core 10 to a preceding transfer core 12 and the return to the particular storage core 10 is accomplished. By the addition of another output winding 15' on each of the transfer cores 12 information returnable to the original storage cores 10 is also available for parallel read-out. In this arrangement as shown in FIG. 4 the common coupling loops 23, instead of coupling the storage cores 10 with the backward transfer cores 12 of succeeding storage units, couple the storage cores 10 with shuttle transfer cores 12 of the same storage units. Thus, a common coupling loop 23 of the register of FIG. 4, for example, couples the forward transfer core $11_1$, the storage core $10_2$, and the shuttle transfer core $12_2$ rather than the backward transfer core $12_n$. In addition, each of the shuttle transfer cores 12 is provided with a second output winding 15' which output winding is connected to an external information output circuit 90. Similar output circuits 90 are to be understood as being provided in conjunction with each of the output windings 15'. Due to the modification in the common coupling loop 23 the illustrative shift register of FIG. 4 is capable of shifting information stored therein in one direction only, that is, in the right-hand direction as viewed in the figure. For this reason only the external information input circuit 50 and the external information output circuit 60 need be provided in this register.

To accomplish the forward or serial shift of information a first phase advance pulse 25 as supplied by the advance pulse source 30 is applied to the advance windings 14 of the storage cores 10 via the advance conductor 17. Assuming again for the purpose of this description that each of the storage cores 10 has stored therein in the form of a particular magnetic saturation a binary value "1," which value will be transferred via the coupling loops 19 to either the forward transfer cores 11 or the shuttle transfer cores 12 by the application of the advance pulse 25 to the storage cores 10, as described in detail hereinbefore in connection with other shift registers of this invention. In the case of a desired forward shift of information an inhibit pulse 26 supplied by the inhibit pulse source 80 is applied to the advance windings 14 of the shuttle transfer cores 12 via the conductor 18 simultaneously with the application of the advance pulse 25. The current induced in the coupling loops 19 by the resetting of the storage cores 10 will as a result have no setting effect on the shuttle transfer cores 12. However, the forward transfer cores 11 will be set by the current in the input windings 13 and the latter cores will now contain the binary values "1" originally stored in the storage cores 10. Upon the subsequent simultaneous application of the second phase advance pulses 27 supplied by the advance pulse sources 20 and 40, the forward transfer cores 11 will be reset and a switching current will now be induced in the output windings 15 of the transfer cores 11 which current will be applied via the common coupling loops 23 through the input windings 13 to set the succeeding storage cores 10. In this manner the binary information values "1" originally contained in the storage cores $10_1$ and $10_2$ will have been transferred to the succeeding storage cores $10_2$ and $10_n$ and the binary value "1" originally stored in the storage core $10_n$ will have been shifted out of the register to the external information output circuit 60. As described hereinbefore for the shift registers of FIGS. 1 and 3, information in the form of binary digits newly to be introduced into the register may be supplied by the external information input circuit 50 via a common coupling loop 23 simultaneously with the application of the second phase advance pulses 27.

If it is desired that the information stored in the shift register of FIG. 4 be available parallelly at the output circuits 90, rather than serially at the output circuit 60, this may be accomplished by selectively applying an inhibit pulse 26 simultaneously with the application of an advance pulse 25 to the advance conductor 16 and thereby to the advance windings 14 of the forward transfer cores 11. As a result as described in detail hereinbefore the binary values "1" assumed to be stored in the storage cores 10 will be transferred to the shuttle transfer cores 12 via the coupling loops 19. Upon the simultaneous application of a second phase advance pulse 27 the newly set shuttle transfer cores 12 will be reset with the result that a current will be induced in the output windings 15 and 15′ of the trannsfer cores 12 thereby returning the "1's" via the common coupling loop 23 to the storage cores 10 in which initially stored. In addition, the voltage induced in the output windings 15′ is available for detection in the information output circuits 90. The character of the information stored in the storage cores 10 of the shift register of FIG. 4 may in this manner be sampled on each occasion upon which the information is returned to an initial storage core 10 from a shuttle storage core 12. The time relationship of the advance pulses 25 and 27 and the inhibit pulses 26 is also shown in FIGS. 2(*a*), 2(*b*), and 2(*c*) representing the pulse trains applied to the advance conductors 16 and 18 simultaneously together with the superimposed inhibit pulses 26 which may be selectively applied to either of the conductors 16 and 18.

FIG. 5 of the drawing illustrates an extension of the principles of this invention to provide a magnetic core shift register in which information stored therein may be shifted serially in either direction or parallelly from a transfer core. In this embodiment the number of cores in the basic storage unit has been increased to include an additional transfer core. Thus in the register of FIG. 5, shuttle transfer cores $12_1'$, $12_2'$, and $12_n'$ have been added to provide the additional function. Each of the shuttle transfer cores 12′ is provided with an input winding 13, an advance winding 14, and two output windings 15 and 15′. Connecting the advance windings 14 of the cores 12′ to a second phase advance pulse source 40′ and an inhibit pulse source 80′ is an advance conductor 18′. The coupling loop 19 couples the storage core 10 of a basic storage unit to a forward transfer core 11, a shuttle transfer core 12′, and a backward transfer core 12, and the coupling loop 23 couples the storage core 10 of a basic storage unit to a shuttle transfer core 12′ of the same storage unit, a forward transfer core 11 of the preceding storage unit, and a backward transfer core 12 of the succeeding storage unit.

Assuming again for purposes of description a binary value "1" to be stored in each of the storage cores 10 and that a shift of information in the forward, or right-hand direction as viewed in FIG. 5, is desired, a first phase advance pulse 25 supplied by the advance pulse source 30 is applied via the conductor 17 to the advance windings 14, thereby resetting the storage cores 10 and inducing a switching current in the coupling loops 19. As hereinbefore described for other shift registers embodying the principles of this invention, this switching current will tend to set the transfer cores 11, 12′, and 12. However, in the case of the desired forward shift of information an inhibit pulse 26 is applied simultaneously with the application of the first phase advance pulse 25 to the conductor 18 and, in addition, to the conductor 18′ from the inhibit pulse sources 80 and 80′, respectively, to inhibit the setting of the transfer cores 12 and 12′. The switching current in the coupling loops 19 will thus cause only the forward transfer cores 11 to be set and the binary value "1" will now be transferred from the storage cores 10 to the transfer cores 11. Upon the subsequent application of the second phase advance pulses simultaneously to the advance conductor 16, 18, and 18′ supplied by the second phase advance pulse sources 20, 40, and 40′, the previously set forward transfer cores 11 will now be reset and the binary values "1" contained in the latter cores will be transferred via the output windings 15 and coupling loops 23 to the next succeeding storage cores 10. The binary values "1" originally stored in the storage cores $10_1$ and $10_2$ will thus have been shifted to the storage cores $10_2$ and $10_n$ and the binary value "1" originally stored in the storage core $10_n$ wil have been shifted out of the register through the output winding 15 of the last forward transfer core $11_n$ to the external information output circuits 60.

In the exent that the shift of information stored in the register is desired in the backward or left-hand direction as viewed in FIG. 5, the operation of the register is similar to that described hereinbefore for the shift register depicted in FIG. 3 of the drawing with the additional inhibiting of the shuttle transfer cores 12′. Information to be newly introduced into the register from either end may again be supplied by the informaiton input circuits 50 or 50′ simultaneously with the application of the second phase advance pulses 27 also as described hereinbefore.

If it is desired that the information stored in the shift register be parallelly available as, for example, when it is desired to sample the information in any particular storage core 10, the operation is similar to that for the shift of information in either direction with the exception that upon the application of the first phase advance pulses 25 to the storage core advance conductor 17 and the connected advance windings 14, inhibit pulses 26 are applied to the advance conductors 16 and 18 by the inhibit pulse sources 70 and 80, respectively, thus permitting only the shuttle transfer cores 12′ to switch their condition of remanent magnetization. Upon the application of a second phase advance pulse 27 the shuttle transfer cores 12′ will now be reset and the current induced in the associated output windings 15′ will be available for detection in the external information output circuits 90. As is also the case in the operation of the other transfer cores, upon the application of an advance pulse 27 through the input advance windings 14, upon the resetting of the shuttle cores 12′ a switching current will be induced in the output windings 15 and the coupling loops 23 with the result that the storage cores 10 will again be set. The binary values "1" originally stored in the storage cores 10 will in this manner have been transferred to the shuttle transfer cores 12′ and thereafter returned to the original storage cores 10. Although it has been assumed for purposes of description that binary values "1" have been originally stored in the storage cores 10, it is to be understood that any pattern of binary values "1" and "0" could have been assumed as stored therein. In the case of a binary value "0" stored in a storage core 10, no switching effect will be caused on the coupling loop 19 by the application of first phase advance pulses 25 and the selected transfer core will simply remain in its unset condition indicating the presence of a binary value "0."

The time relationship of the advance pulses applied in the first and second phase of operation of the register together with the inhibit pulses 26 selectively applicable to the advance conductors 16, 18, and 18′ is as shown in FIG. 2 of the drawing, FIG. 2(*b*) in this instance showing the pulse train together with the superimposed inhibit pulses 26 applied to the advance conductor 18′ when a shift of information in either direction is desired in the register as well as the pulse train applied to conductor 16 or 18, depending on the direction of the transfer. As is the case in the registers previously described herein undesired shift of information between the transfer cores and storage cores is prevented by an appropriate selection of turns ratios of the output and input windings and the suitable application of the unilateral conducting elements 21.

What has been described are considered to be illustrative embodiments of the present invention and it is to be understood that other arrangements embodying the principles of this invention may be devised by one skilled in the art without departing from its spirit and scope.

What is claimed is:

1. An electrical shift register circuit comprising a plurality of storage magnetic cores, a forward, a backward, and a shuttle transfer magnetic core associated with each of said plurality of storage cores, each of said cores having substantially rectangular hysteresis characteristics, an input, an output, and an advance winding on each of said cores, a first coupling circuit including a single unidirectional conducting element for connecting the output winding of each of said plurality of storage cores and the input windings of its associated forward, backward, and shuttle transfer cores in series, a second coupling circuit including a single unidirectional conducting element for connecting the input winding of each of said plurality of storage cores, the output winding of its associated shuttle transfer core, the output winding of the forward transfer core associated with the preceding storage core, and the output winding of the backward transfer core associated with the succeeding storage core in series, a first advance circuit means for connecting the advance windings of said plurality of storage cores in series, a second advance circuit means for connecting the advance windings of said forward transfer cores in series, a third advance circuit means for connecting the advance windings of said backward transfer cores in series, a fourth advance circuit means for connecting the advance windings of said shuttle transfer cores in series, means for applying periodic first advance current pulses to said first advance circuit means, means for simultaneously applying periodic second advance current pulses to said second, third, and fourth advance circuit means alternately with said first advance current pulses, and means for selectively applying inhibit current pulses to said second, third, and fourth advance circuit means simultaneously with said first advance current pulses.

2. An electrical shift register as claimed in claim 1 also comprising second output windings on each of said shuttle transfer cores.

3. In an electrical shift register, a first, second, and third storage magnetic core, a first and a second forward transfer magnetic core associated respectively with said first and said second storage core, a first and a second backward transfer magnetic core associated respectively with said second and said third storage core, a shuttle transfer magnetic core associated with said second storage core, each of said magnetic cores having substantially rectangular hysteresis characteristics, an input, an output, and an advance winding on each of said magnetic cores, a first coupling circuit including only a single unidirectional conducting element for connecting the output winding of said second storage core and the input windings of said second forward transfer core, said shuttle transfer core, and said first backward transfer core in series, a second coupling circuit including only a single unidirectional conducting element for connecting the input winding of said second storage core and the output windings of said first forward transfer core, said shuttle transfer core, and said second backward transfer core in series, a first, second, third, and fourth advance circuit means including respectively the advance windings of said storage, forward transfer, backward transfer, and shuttle transfer magnetic cores, means for applying periodic first advance current pulse to said first advance circuit means, means for simultaneously applying periodic second advance current pulses to said second, third, and fourth advance circuit means alternately with said first advance current pulses, means for selectively applying inhibit current pulses to said second, third, and fourth advance circuit means simultaneously with said first advance current pulses, and a shuttle output winding on said shuttle transfer core.

4. In a magnetic core shift register having a plurality of stages, each of said stages comprising a storage magnetic core, a forward transfer magnetic core, a backward transfer magnetic core, and a shuttle transfer magnetic core, individual advance circuit means for each of the cores of each of said stages, each of the cores of each of said stages having an input and an output winding thereon, the combination comprising a first coupling circuit for each of said stages including only a single unidirectional conducting element for connecting the output winding of the storage core and the input windings of the forward transfer, the backward transfer, and the shuttle transfer core in series, a second coupling circuit for each of said stages including only a single unidirectional conducting element for connecting the input winding of the storage core, the output winding of the shuttle transfer core, the output winding of the forward transfer core of a preceding stage, and the output winding of the backward transfer core of a succeeding stage in series, and means for applying inhibit current pulses to the advance circuit means of all except a selected one of said transfer cores of said stages simultaneously with the energizing of the advance circuit means of the storage cores of said stages.

5. An electrical shift register circuit comprising a plurality of storage magnetic cores arranged in sequence, a plurality of forward transfer magnetic cores, a plurality of backward transfer magnetic cores, and a plurality of shuttle transfer magnetic cores, said forward, backward, and shuttle transfer magnetic cores being arranged respectively in alternating sequences with said storage magnetic cores, each of said magnetic cores having substantially rectangular hysteresis characteristics, an input, an output, and an advance winding on each of the cores of each of said pluralities of cores, a first plurality of coupling circuits each including only a single unidirectional conducting element for connecting the output winding of each core of said plurality of storage cores and the input windings of a succeeding forward, a preceding backward, and a particular shuttle transfer core in series, a second plurality of coupling circuits each including only a single unidirectional conducting element for connecting the input winding of each core of said plurality of storage cores, the output winding of a preceding forward, a succeeding backward, and said particular shuttle transfer core in series, a first, a second, a third, and a fourth advance circuit means for connecting respectively the advance windings of said pluralities of storage cores, forward transfer cores, backward transfer cores, and shuttle transfer cores in series, first information input circuit means including an input coupling circuit including a single unidirectional conducting element and connecting the input winding of the first of said sequence of storage cores, the output winding of the first of said backward transfer cores, and the output winding of the first of said shuttle transfer cores in series, second information input circuit means including an input coupling circuit including a single unidirectional conducting element and connecting the input winding of the last of said sequence of storage cores, the output winding of the last of said forward transfer cores, and the output winding of the last of said shuttle transfer cores in series, output circuit means connected to said first backward transfer core and said last forward transfer core and to each of said shuttle transfer cores, means for applying periodic first advance current pulses to said first advance circuit means, means for simultaneously applying periodic second advance current pulses to said second, third, and fourth advance circuit means alternately with said first advance current pulses, and means for selectively applying inhibit current pulses to said second, third, and fourth advance circuit means simultaneously with said first advance current pulses.

References Cited in the file of this patent

UNITED STATES PATENTS

| | | |
|---|---|---|
| 2,673,337 | Avery | Mar. 23, 1954 |
| 2,695,993 | Haynes | Nov. 30, 1954 |
| 2,708,722 | An Wang | May 17, 1955 |
| 2,758,221 | Williams | Aug. 7, 1956 |
| 2,785,390 | Rajchman | Mar. 12, 1957 |
| 2,805,409 | Mader | Sept. 3, 1957 |
| 2,911,621 | Crooks | Nov. 3, 1959 |